(12) United States Patent
Bacho et al.

(10) Patent No.: US 7,717,269 B2
(45) Date of Patent: May 18, 2010

(54) SNAP LOCK SEPARATORY PANEL AND RETAINER SYSTEM

(75) Inventors: Frank J. Bacho, Princeton, WV (US); Tracy Leonard Lane, Princeton, WV (US)

(73) Assignee: Conn-Weld Industries, Inc., Princeton, WV (US)

( * ) Notice: Subject to any disclaimer, the term of this patent is extended or adjusted under 35 U.S.C. 154(b) by 376 days.

(21) Appl. No.: 11/798,537

(22) Filed: May 15, 2007

(65) Prior Publication Data
US 2008/0283448 A1    Nov. 20, 2008

(51) Int. Cl.
*B07B 1/49* (2006.01)
(52) U.S. Cl. ...................................... 209/399; 209/405
(58) Field of Classification Search .................. 209/399, 209/405
See application file for complete search history.

(56) References Cited

U.S. PATENT DOCUMENTS

| | | | | |
|---|---|---|---|---|
| 3,795,311 | A * | 3/1974 | Martin | 209/395 |
| 4,283,278 | A * | 8/1981 | Savage et al. | 209/395 |
| 4,909,929 | A * | 3/1990 | Tabor | 209/400 |
| 5,112,475 | A * | 5/1992 | Henry, Jr. | 209/399 |
| 5,248,043 | A * | 9/1993 | Dorn | 209/399 |
| 5,277,319 | A * | 1/1994 | Henry, Jr. | 209/399 |
| 5,361,911 | A * | 11/1994 | Waites et al. | 209/399 |
| 5,398,817 | A | 3/1995 | Connolly et al. | |
| 5,755,334 | A * | 5/1998 | Wojcik et al. | 209/399 |
| 5,769,241 | A * | 6/1998 | Woodgate | 209/399 |
| 6,206,200 | B1 * | 3/2001 | Gilles et al. | 209/399 |
| 6,964,341 | B2 | 11/2005 | Bacho et al. | |
| 7,090,083 | B2 * | 8/2006 | Russell et al. | 209/405 |
| 7,273,151 | B2 * | 9/2007 | Sawall et al. | 209/405 |
| 7,296,685 | B2 * | 11/2007 | Malmberg | 209/405 |
| 2002/0195377 | A1* | 12/2002 | Trench et al. | 209/365.1 |
| 2005/0167341 | A1* | 8/2005 | Bacho et al. | 209/405 |

* cited by examiner

*Primary Examiner*—Patrick Mackey
*Assistant Examiner*—Terrell H Matthews
(74) *Attorney, Agent, or Firm*—Jones, Tullar & Cooper, P.C.

(57) ABSTRACT

A snap lock separatory panel and retainer system includes either a screen wire panel with laterally spaced, longitudinally extending locking bars defining a locking profile, or a urethane panel with laterally spaced, longitudinally extending lips or flanges which also define a locking profile. A retainer system is provided for use in securing these panels. The retainer system utilized center retainers that are engagable with industry standard holes in screen stringer rails of a vibrating separating machine. Each center retainer is provided with an array of retainer pins which are spaced to interdigitate with either screen wire tie rod ends or with urethane panel wall recesses to support the screen panel locking bars or the urethane panel flanges adjacent the retainer pins. Locking strips are provided with undercurrent bores that terminate in undercut receptacles. These bores and receptacles are sized to receive center retainer pin shanks and heads. The locking strips and center retainers cooperate to positively secure the snap lock screen wire panels and/or urethane panels in place on a vibrating separatory machine.

25 Claims, 11 Drawing Sheets

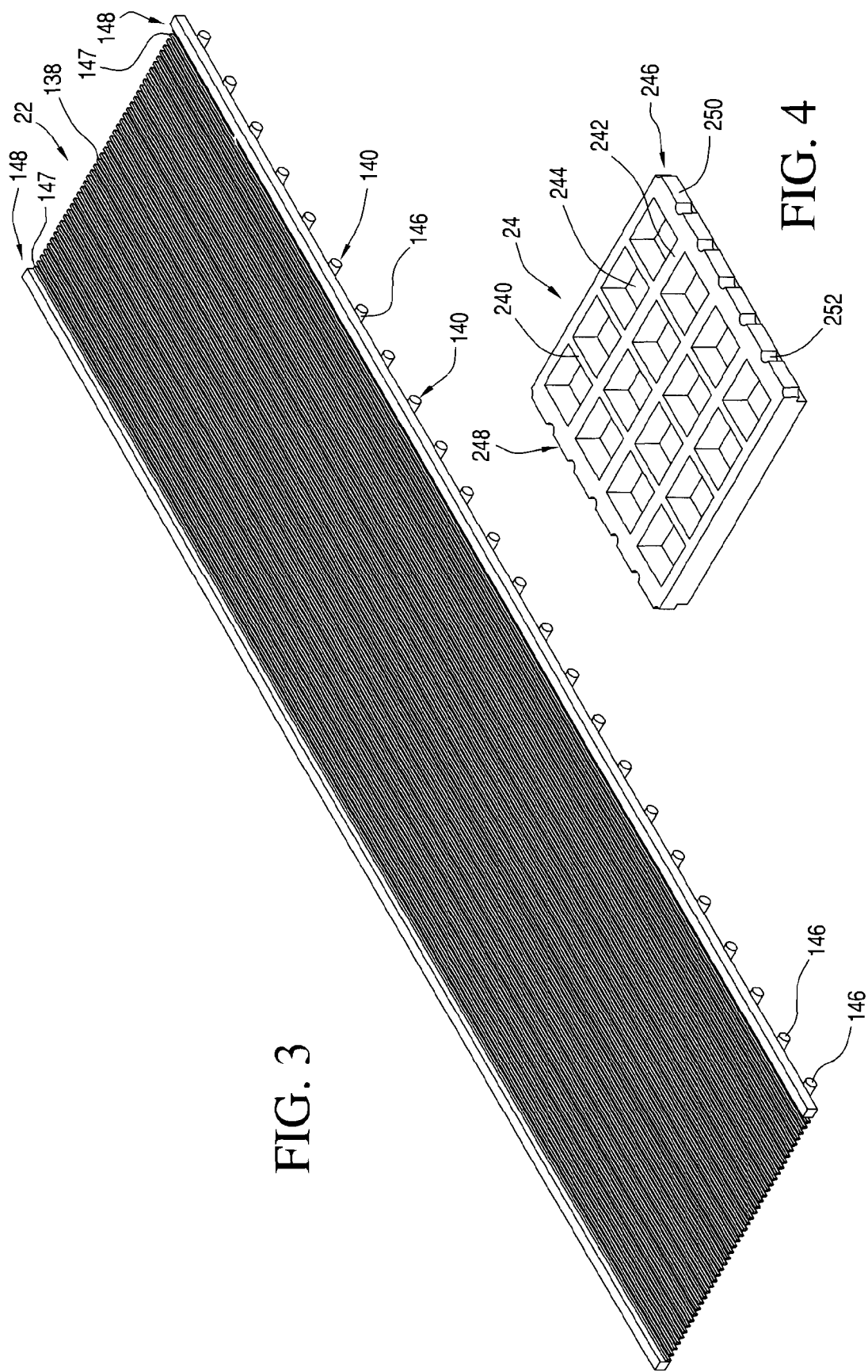

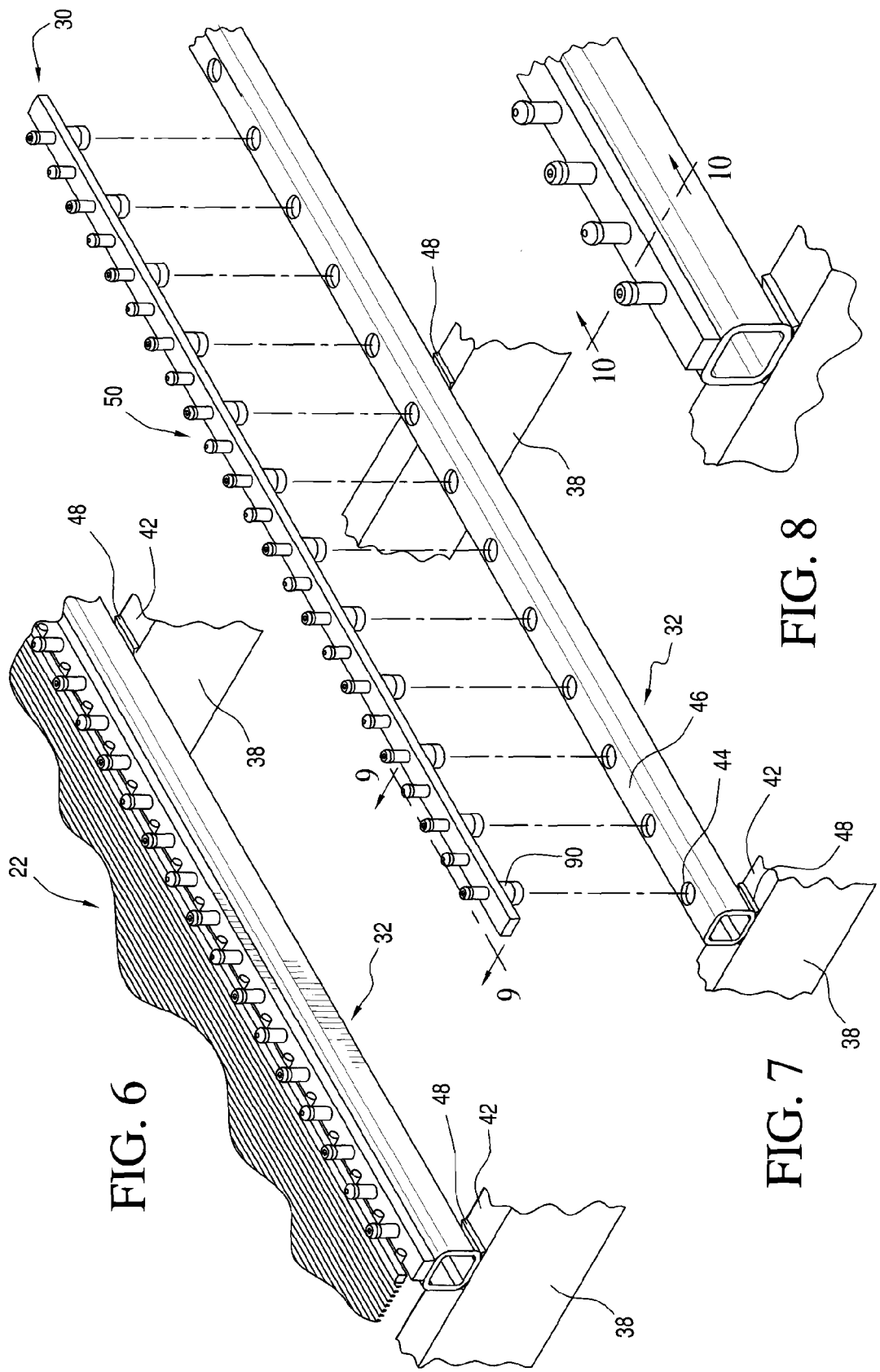

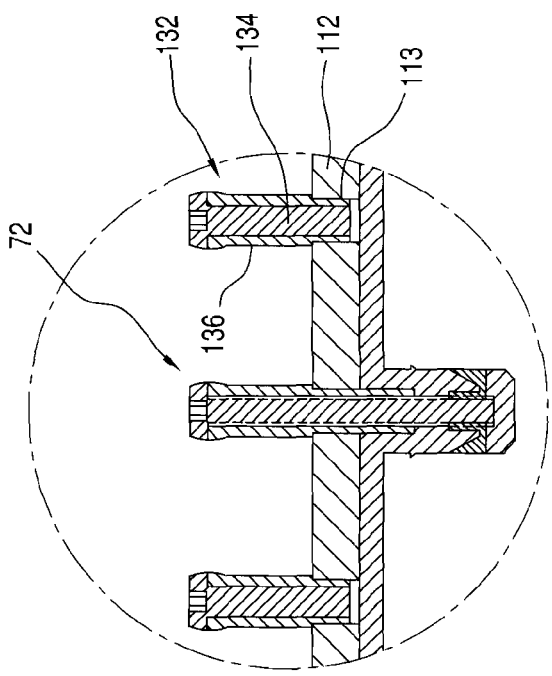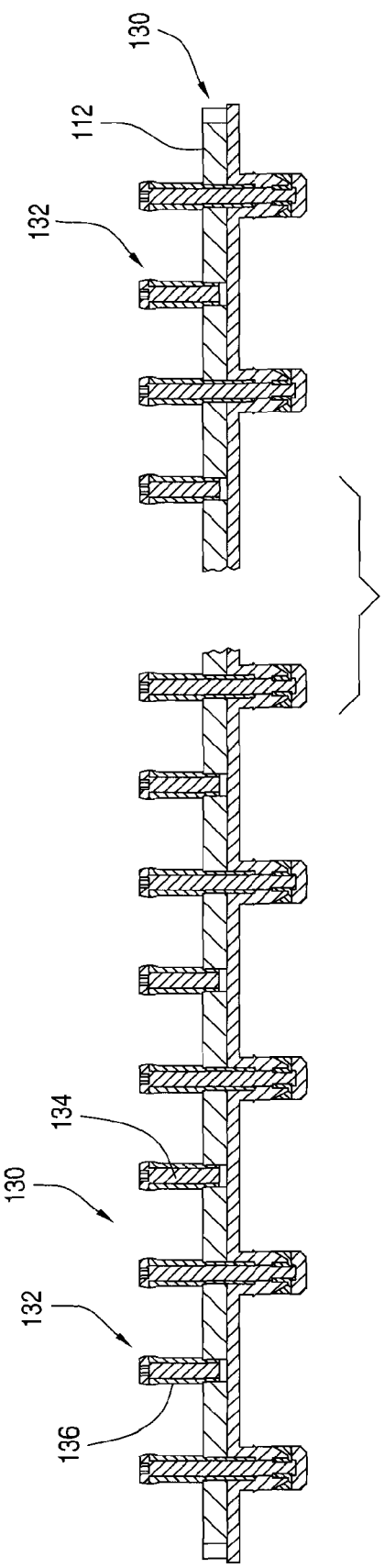
FIG. 18
FIG. 17

SNAP LOCK SEPARATORY PANEL AND RETAINER SYSTEM

FIELD OF THE INVENTION

The present invention is directed generally to a snap lock separatory panel retainer system and to a separatory panel which is usable with such a retainer system. More particularly, the present invention is directed to a separatory panel retainer system that retains separatory panels in a vibrating separatory machine. Most specifically, the present invention is directed to a separatory panel retainer system that utilizes elongated locking strips which engage locking profiles on separatory panels in the vibrating separatory device. These locking strips utilize undercut receptacles to receive enlarged heads of retainer pins that are formed integrally with center retainer strips. The center retainer strips are, in turn secured to screen stringer rails that are typically provided in vibrating separating machines. The locking strips are snap locked onto the center retainer by the engagement of the enlarged heads of the retainer pin in the cooperatively shaped under cut receptacles in the locking strips. The separatory panels that are held in place in the vibrating separating machine are structured having locking profiles which underlie the locking strips in the assembled configuration of the snap lock separatory panel retainer system. Lower ends of selected ones of the retainer pins are received in spaced holes in the screen stringer rail. These retainer pin lower ends are radially expandable to retain the center retainer in screen stringer rails whose holes are of these proper dimensions or whose holes have become oversized due to wear.

BACKGROUND OF THE INVENTION

Vibrating and other separatory screen assemblies are generally known in the art and are very useful in accomplishing the separation of materials on the basis of size of the materials to be separated. A slurry of liquid and entrained solids will be caused to run or flow across an upper surface of a screen panel assembly. Particles of a certain size and above will not pass through apertures in the screen panels and will thus be separated out. The screen panel assembly is caused to vibrate by a suitable means, with this vibratory motion being beneficial in facilitating the proper separation of the material directed onto the screen panel.

One such vibratory screen panel assembly is shown in U.S. Pat. Nos. 5,112,475 and 5,277,319, both to Henry, and both assigned to Conn-Weld Industries, the assignee of the present application. In these two patents, there is disclosed a screen panel mounting system for a vibrating screen assembly, and a screen panel which is securable in the vibrating screen assembly using the panel mounting system. A plurality of screen panels are secured to a panel deck of a frame portion of a vibrating screen assembly. A plurality of elongated hold downs or center retainers, which are made of a resilient elastomeric material, such as polyurethane, are provided with spaced anchoring pins along their bottom surface. These anchoring pins are receivable in apertures in an anchor member. Once the hold down members or center retainers have been secured to the anchor member, which is, in turn, attached to spaced cross members or tubes of the frame of the vibratory separator, the screen panels are placed atop the panel deck with their side edges in contact with the center retainers. Elongated key members are inserted into upwardly facing slots in the center retainers to spread wing portions of the retainers laterally outwardly. This spreading of the wings of the center retainers causes the wings to grip the side edges of the screen panels so that these panels are secured in the vibrating screen assembly.

The panel mounting system disclosed in the two above-referenced Henry patents, which are assigned to Conn-Weld Industries, utilizes screen panels and cooperating anchor members which are bolted, welded or otherwise secured to cross members of the panel deck of the vibrating screen assembly. An owner of a vibrating screen apparatus which is not provided with the appropriate anchor members disclosed in the prior Henry patents must make substantial revisions and modifications to his vibrating screen assembly if he is to be able to enjoy the advantages of the Conn-Weld Industries panel mounting system.

A center retainer assembly for a panel mounting system is disclosed in U.S. Pat. No. 5,398,817 to Connolly et al. and also assigned to Conn-Weld Industries. The center retainer assembly described in the '817 patent utilizes an elongated bolting bar which is encased in a resilient material and which includes an elongated center retainer. The center retainer assembly is placed into an upwardly facing retainer channel and is secured to the retainer channel by placement of the bolts carried by the bolting bar through holes in the retainer channel. The retainer channel is, in turn, secured to mounting plates that are attached to a cross tube or to a cross bar of a vibrating screen assembly.

A more recent screen panel retainer system is described in the U.S. Pat. No. 6,964,341 to Bacho, et al., which is also assigned to Conn-Weld Industries, the assignee of the subject patent application. In that system, the screen panels are held in place by screen panel edge strips that have pockets on their undersurfaces. Those pockets are cooperatively shaped to receive a plurality of ears that are situated on upper surfaces of retainer bars. These retainer bars are connected to the underlying screen stringer rails. While the screen panel retainer system described in the Bacho et al. patent has found acceptance in the industry because it does not require modification, or re-working of the industry standard screen stringer rails, it has been found to be somewhat difficult to use and has required the provision of screen panel edge strips which have been less easily installed than would be desired. Adjacent screen panels have required the use of cooperating and abutting screen panel edge strips. This alignment and abutment has been somewhat difficult to obtain in the field and has increased the time that has been required to initially install the system and to then replace worn screen panels with replacement screen panels. In an industrial setting, the amount of time that is required for a machine to be out of service, for repair or refurbishment results in a loss of production capability. Such lost production time should obviously be kept to a minimum. In the screen panel retainer system described in the Bacho et al. patent, these times were not able to be minimized to the hoped for degree.

The need still exists for a separatory panel retainer system that is compatible with current industry standard vibrating separatory machines and which can be quickly and expeditiously installed and maintained. In addition, the separatory panel retainer system must have the capability to accommodate to both new machines, as well as to older, used machines. The screen stringer rails which are secured atop the cross tubes or cross bars of the typical vibrating separatory machine, are typically configured with spaced holes along their upper faces. These spaced holes are used for the attachment of the screen panels to the machine's frame.

When the machine is new, all of the holes on the screen stringer rails are of uniform size. A number of currently available screen panel retention systems depend on the proper dimensioning of those holes to accomplish the securement of the screen panels to the machine frame.

Vibrating separatory machines are frequently used in applications in which a relatively abrasive material is separated from a suspension fluid, such as water. The slurry of fine abrasive particles and the suspension fluid finds its way into all of the components of the screen assembly, including into the spaces that exist between the screen panel connection mechanisms and the holes or apertures in the screen stringer rails. Over the course of time, the slurry abrades the holes and causes them to enlarge. This abrading action is enhanced by the vibration to which the separatory machine is continually subjected.

Eventually, these holes in the screen stringer rails become enlarged. Since a number of the currently available panel retainer systems utilize some type of an interference fit of pins, pegs or the like into these holes, the enlargement of these holes is problematic. At some point, the stringer rail holes become so enlarged that they will no longer engage the pins or pegs with sufficient retentive force. At such time, the screen stringer rails have to be refurbished, the screen panel retainers have to be modified or the screen stringer rails simply have to be replaced with new rails. In each such instance, the process involves considerable work and the equipment being taken out of service.

The prior Bacho et al. U.S. Pat. No. 6,964,341 addressed this issue by the use of self-expanding polyurethane plugs. These plugs are expandable radially by the tightening of a bolt to radially expand a polyurethane sleeve which is initially sized to be insertable into the conventionally spaced and sized holes in the screen stringer rails. The snap lock screen panel and retainer system in accordance with the present invention continues to utilize this feature of the prior Bacho et al. system. Improvements have been made so that the threaded bolts which cause the expansion of the polyurethane plugs, cannot be tightened so that they will strip out the expander nuts which are pulled up toward the center retainer bar to expand the polyurethane sleeve radially.

A need thus exists for a screen panel retainer system that uses a minimum of parts, that is tolerant of dimensional variations and that is quick and easy to install and use. The snap lock separatory panel and retainer system in accordance with the present invention overcomes the limitations of the prior art and is a substantial improvement over the presently available systems.

SUMMARY OF THE INVENTION

It is an object of the present invention to provide a snap lock separatory panel and retainer system.

Another object of the present invention is to provide a separatory panel retainer system that is usable with conventional vibrating separatory machinery.

A further object of the present invention is to provide a separatory panel retainer system and a cooperating separatory panel that includes elongated center retainers with expandable screen stringer rail engaging plugs.

Still another object of the present invention is to provide a snap lock separatory panel and retainer system which includes locking strips that engage pins projecting upwardly from a center retainer.

Even a further object of the present invention is to provide a snap lock separatory panel and retainer system that is easy to use and which takes little time to assemble and to remove.

As will be described in detail in the description of the preferred embodiment, which is set forth subsequently, the snap lock separatory panel and retainer system in accordance with the present invention is an improvement over the assignee's prior system, as described in U.S. Pat. No. 6,964,341 to Bacho et al. In the present invention, a center retainer is securable to the stringer screen rails of a generally conventional vibrating separating machine. As was the case in the prior Bacho et al. patent, the center retainer includes a center retainer spine that may be encased in, or which may be supported by, a resilient material, such as polyurethane, and which includes a plurality of spaced, upwardly projecting pins. Each such pin features an enlarged head that projects above the center retainer spine and its resilient sheathing. Each of these pins is sized and spaced to cooperate with a locking strip having a plurality of undercut receptacles extending into the locking strip from a bottom surface thereof. The enlarged heads of the pins are securable in the individual receptacles in the locking strip thus providing a snap fit between the center retainer and the locking strip. Such a snap fit is both secure and easily taken apart.

The snap lock separatory panel is structured using either the profile screen wires and transverse tie rods, that are generally known in the field, or using urethane panels. Each screen panel has a pair of screen locking bars attached to it with these two screen locking bars extending parallel to the screen profile wire and perpendicular to the screen tie rods and forming a locking profile. The urethane panels include flanged edges which flanged edges also define locking profiles. The screen locking bars are welded to the ends of the tie rods that extend laterally to the sides of the profile screen wires. The dimensions of the screen locking bars, and of the panel flanges, are selected so that when a separatory panel in accordance with the present invention, and including the locking profiles is installed in a vibrating separatory machine that has been fitted with the center retainer of the present invention, the undersurface of the locking strip, as it is snapped onto its securement position atop the center retainer, will engage the upper surface of the locking profile. This will insure that each separatory panel is held securely in place so that it will not become dislodged during operation of the vibrating separatory machine which receives the separatory panels.

In some of the previous screen panel attachment systems, the screen stringer rails had to be modified or removed to accommodate the intended screen panel retention assembly. The snap lock separatory retainer system of the present invention does not require any modification of the underlying assembly of the separatory machinery with which it is being used. The center retainer of the present retention system adapts to the industry standard hole spacing pattern of the screen stringer rails. No modifications or re-working of those rails is required.

In the snap lock separatory panel and retainer system in accordance with the present invention, there is a unique cooperation between the structure of the center retainer, its cooperating locking strip, and the separatory panel which is being retained. This unique relationship provides for a tight, positive, reliable fitment of the separatory panels in the vibrating separatory machine. It also insures that the screen panels will have a degree of structural stiffness that is not present in typical screen panels. The utilization of the screen locking bars at both of the longitudinal sides of each screen panel provides a resistance to flexure that allows the screen panels to stay in place on the center retainer. The sizing of the screen locking bars insures that they will be positively engaged by both an upper surface of the center retainer, and a lower surface of the locking strip. This positive clamping of the screen locking bars insures that the screen panels will not move or become dislodged. Similarly, the structure and dimensioning of the locking flanges of the urethane panels will insure that these panels are positively engaged and held in place.

The snap lock separatory panel and retainer system in accordance with the present invention is much more easily used than the prior systems that it is intended to replace. The upwardly projecting pins are not susceptible to damage or breakage. They do not become bent or worn during use. They are engaged by the undercut receptacles in the locking strips, and once those locking strips have been snapped into place, the pins are out of sight and are protected. The locking strips are simple, one piece construction that are not structurally complex and which can be easily replaced as they become worn. The center retainers are ensheathed in a resilient material, such as polyurethane, or are made from a formable material, such as nylon or other materials such as UHMW plastic, and are protected from the abrasive slurry that is being separated, by the locking strips and by the locking profiles on outboard ends of the separatory panels. Suitable cross dams can be utilized, in conjunction with the locking bars, to control the flow of the slurry which is being separated by the vibrating separatory machinery. Selected ones of these cross dams include ends that have the undercut receptacles, similar in their arrangement to that of the locking strips. The spacing between successive ones of these transverse dams is typically the same as in prior separatory devices. The dams thus typically overlie junctions between adjacent ones of the separatory panels, in the direction of the flow of the slurry that is to be separated.

Instead of supporting separatory panels comprised of a plurality of screen panels, having profile screen wires, the vibrating separatory machine can utilize separatory panels comprised of a plurality of urethane panels that also act to separate materials, and which urethane panels can also be secured by the center retainers and locking strips. The longitudinal sides of these urethane panels can be cut to receive the upstanding pins of the center retainer. The height of the urethane panel sides is substantially the same as the height of the screen panels and screen panel locking bars. Each urethane panel longitudinal side includes a flange that forms that panel's locking profile. The locking strips thus again will snap fit onto the enlarged heads of the pins. This again will insure that the urethane screen panels are positively secured to the screen stringer rails of the vibrating separatory machinery and will not become loose or dislodged.

Removal of old or worn screen panels or urethane panels from the body of the separatory machinery is easily and quickly accomplished. Each locking strip and cross dam is removable simply by inserting a thin tool blade between one end of a locking strip and an upper surface of one of the panel locking profiles. Upward prying motion exerted on the tool will separate the first several pins of the center retainer from their respective undercut receptacles on the locking strip. Once this initial separation has been accomplished, the locking strip can be easily pulled up and removed. As soon as the locking strips and cross dams have been pried off, the screen panels or the urethane panels can be elevated vertically and can then be easily removed from the vibrating separatory machine. The center retainer bar remains in place, attached to the screen stringer rails. Since the upwardly projecting pins of the center retainer bar are never exposed to the abrasive slurry, because they are covered by the locking strips when the machinery is in use, they typically do not need to be removed or replaced. The holes in the screen stringer rails will not be exposed to the abrasive slurry and will not enlarge to any substantial extent. Any such hole enlargement will be compensated for by the adjustable radial expansion of the lower ends of the selected ones of the retainer pins which are receivable in the holes in the screen stringer rails.

The snap lock separatory panel and retainer system in accordance with the present invention overcomes the limitations of the prior system and assemblies. It is a substantial advance in the art.

BRIEF DESCRIPTION OF THE DRAWINGS

While the novel features of the snap lock separatory panel and retainer system in accordance with the present invention are set forth with particularity in the appended claims, a full and complete understanding of the invention may be had by referring to the detailed description of the preferred embodiments which is presented subsequently, and as illustrated in the accompanying drawings, in which:

FIG. 3 is a perspective view of a snap lock screen panel in accordance with the present invention;

FIG. 4 is a perspective view of one of the plurality of urethane panels in accordance with the present invention and which can be attached to the vibrating separatory machine in combination with, or instead of the snap lock screen panel depicted in FIG. 3;

FIG. 6 is an enlarged perspective view of one screen stringer rail with a center retainer attached to its upper surface and supporting one side of a snap lock screen panel;

FIG. 7 is an exploded perspective view of the screen stringer rail and showing a center retainer attachable to the upper surface of that rail;

FIG. 8 is an enlarged perspective view of a portion of the screen stringer rail shown in FIGS. 6 and 7, with the center retainer secured in place;

FIG. 17 is a cross-sectional view of a portion of a fourth preferred embodiment of a center retainer bar in accordance with the present invention;

FIG. 18 is an enlarged view of the encircled portion of FIG. 17;

DESCRIPTION OF THE PREFERRED EMBODIMENTS

Figure 1:
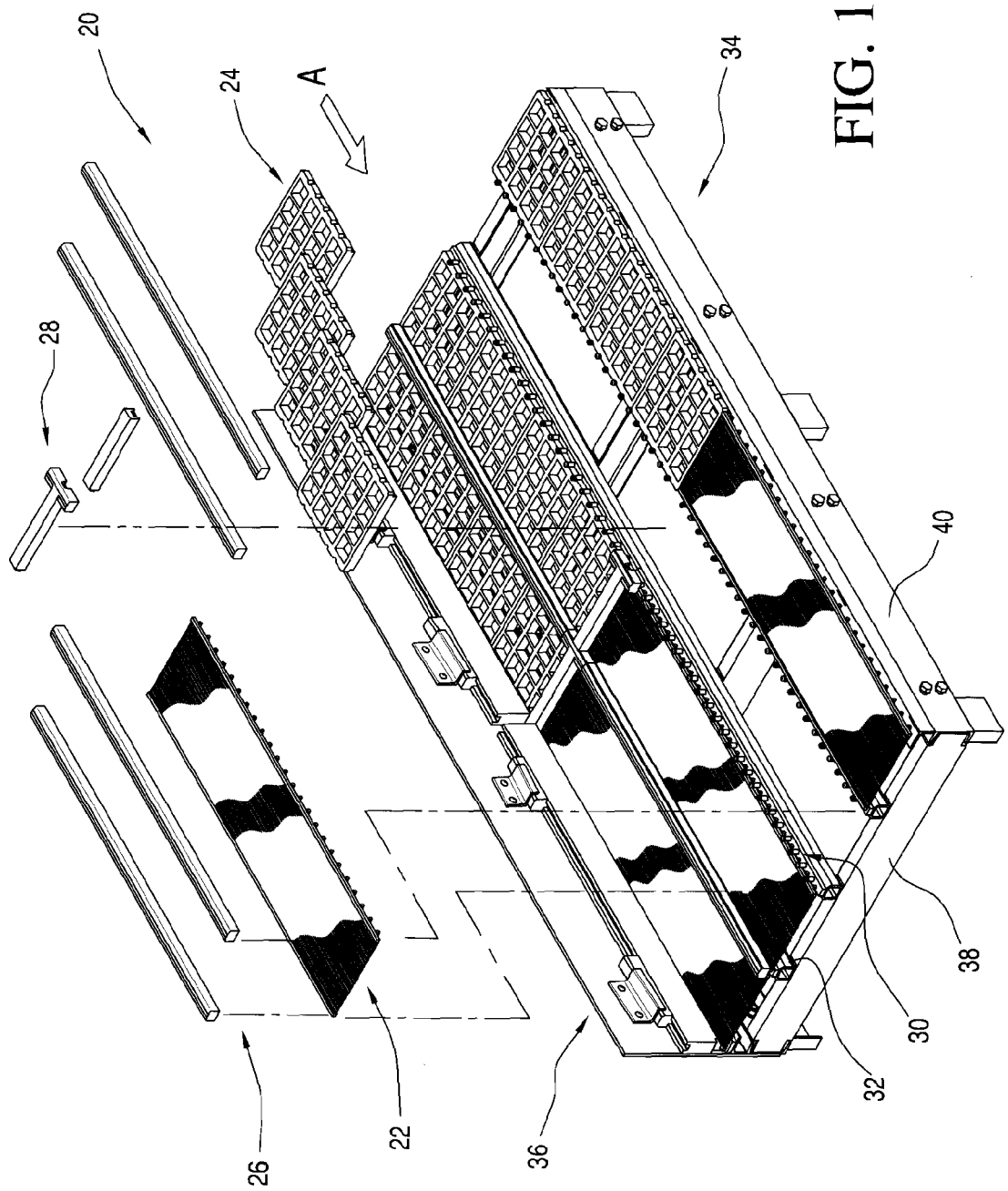
FIG. 1 is an exploded perspective view of a portion of a vibrating separatory machine and showing the various components of a snap lock separatory panel and retainer system in accordance with the present invention.

Referring initially to FIG. 1, there may be such, generally at 20, a first preferred embodiment of a snap lock separatory panel and retainer system in accordance with the present invention. A plurality of snap lock screen panels, each generally at 22, and referred to hereafter as screen panels 22, or a plurality of urethane panels, each generally at 24, are adapted to be secured, by the cooperation of a plurality of individual locking strips, each generally at 26, and by a plurality of cross dams, each generally at 28, to elongated center retainers, each generally at 30 to form a snap lock separatory panel and retainer system which is intended to removably secure the individual screen panels 22 and also to secure the individual urethane panels 24 to suitable screen stringer rails 32 of a commercially available vibrating separatory machine 34, a portion of which is depicted schematically in FIGS. 1 and 2, at 34.

Figure 2:
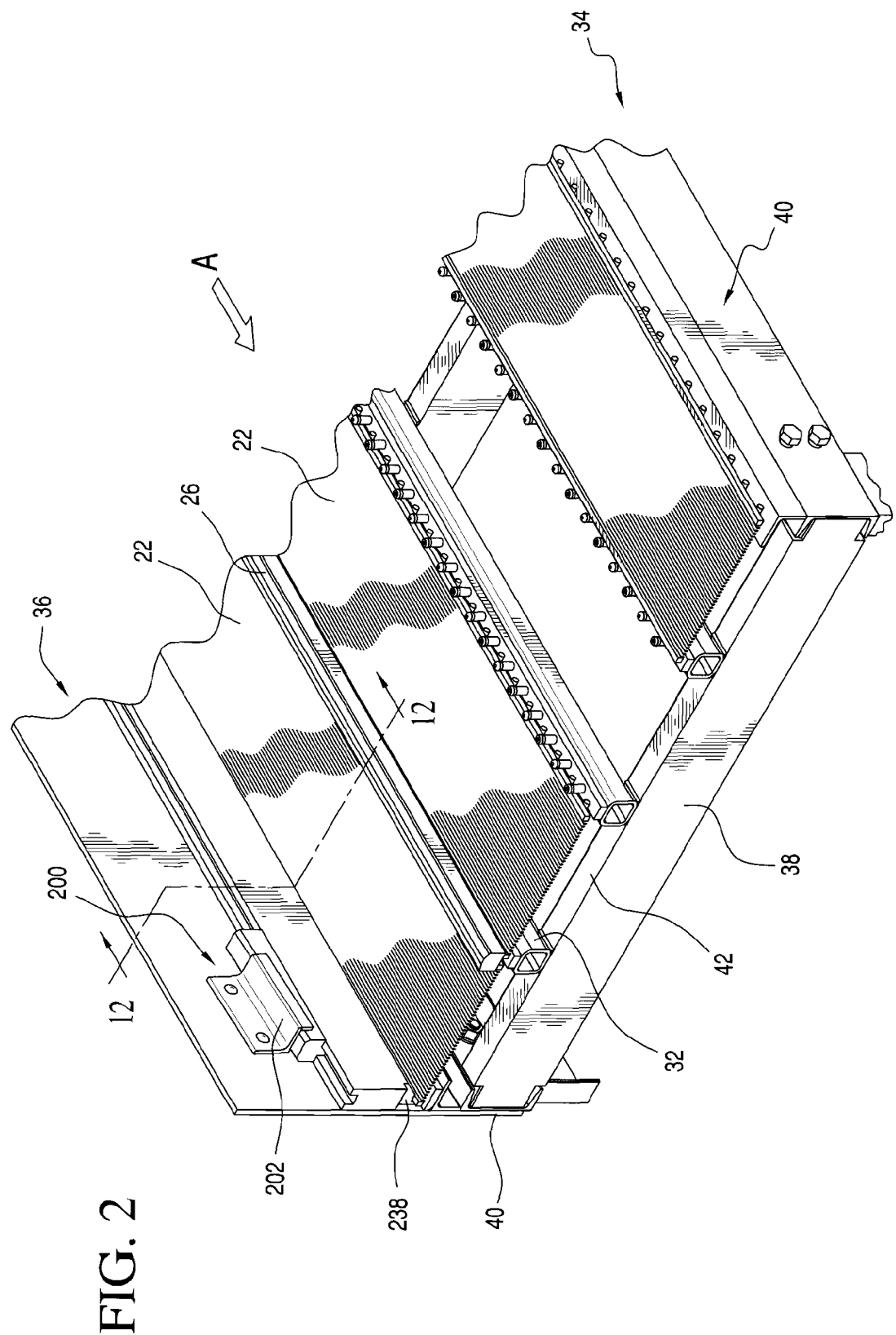
FIG. 2 is a perspective view of a portion of the separatory machine with the various components of the retainer system in their assembled positions and with several of the screen panels and locking strips not installed.

Vibrating separatory machines 34 are generally well known in the art and are typically used to separate a slurry into its liquidus and solidus components. The slurry is fed over the screen panels 22 and/or the urethane panels 24 while those panels, and the bed of the vibrating separatory machine 34 is caused to shake or vibrate. The liquidus material flows down between spaced profile wires in the screen panels, or through apertures in the urethane panels, while the solidus material is carried forward along the typically inclined bed of the vibrating separating machine, as a result of its vibration. Such machines generally are a staple article in the relevant industry and need not be described in detail at this point. As seen in FIGS. 1 and 2, such vibrating separatory machines, generally at 34 typically include a pair of side walls, generally at 36, only one of which is shown in FIGS. 1 and 2. A plurality of cross members 38 extend between a pair of longitudinally extending side panel channel iron frame members 40. The side panel channel iron frame members 40 support the spaced side walls 36 and all are aligned generally with the flow direction of the material to be separated, as indicated by the flow arrow A in FIGS. 1 and 2. The plurality of cross members 38 extends transversely to the flow direction A between the channel iron frame members 40. These structural elements define the overall shape of the bed portion of a typical vibrating separatory machine and are again intended to be only one example of a plurality of possible frame configurations that are utilized to provide frame beds.

A number of longitudinally extending screen stringer rails 32 are secured to top faces 42 of the transversely spaced cross members 38. These screen stringer rails 32 extend generally in the material flow direction A. In a typical vibrating separatory machine 34, each screen stringer rail 32 is typically a square stainless steel tube with an outer wall height and width of 2 inches and with a wall thickness of ¼ inch. It will be understood that the vibrating separatory machine 34 described above, and as will be further described subsequently, forms no part of the subject invention. It is the base to which the separatory panels 22 and/or 24 are attached by operation of the snap lock separatory panel and retainer system 20 of the present invention.

As may be seen most clearly in FIG. 7, and as discussed above, each screen stringer rail 32 is typically a square stainless steel tube with a plurality of holes 44 evenly longitudinally spaced along a top face 46 of each screen stringer rail 32. These holes 44 are typically ⅞ inch in diameter and are spaced on 4 inch centers along the top face 46 of the screen stringer rail 32. This hole spacing has been, at least unofficially adopted as an industry standard and is typically found on machines of this type, irrespective of the manufacturer of the machine. Each of the screen stringer rails 32 is attached to the plurality of cross members 38 typically by welding, as depicted schematically at 48 in FIG. 7. This method of attachment of the stringer tubes 32 to the cross members 38 is again only one example of various structural attachment methods and techniques which are generally known in the industry.

Figure 9:
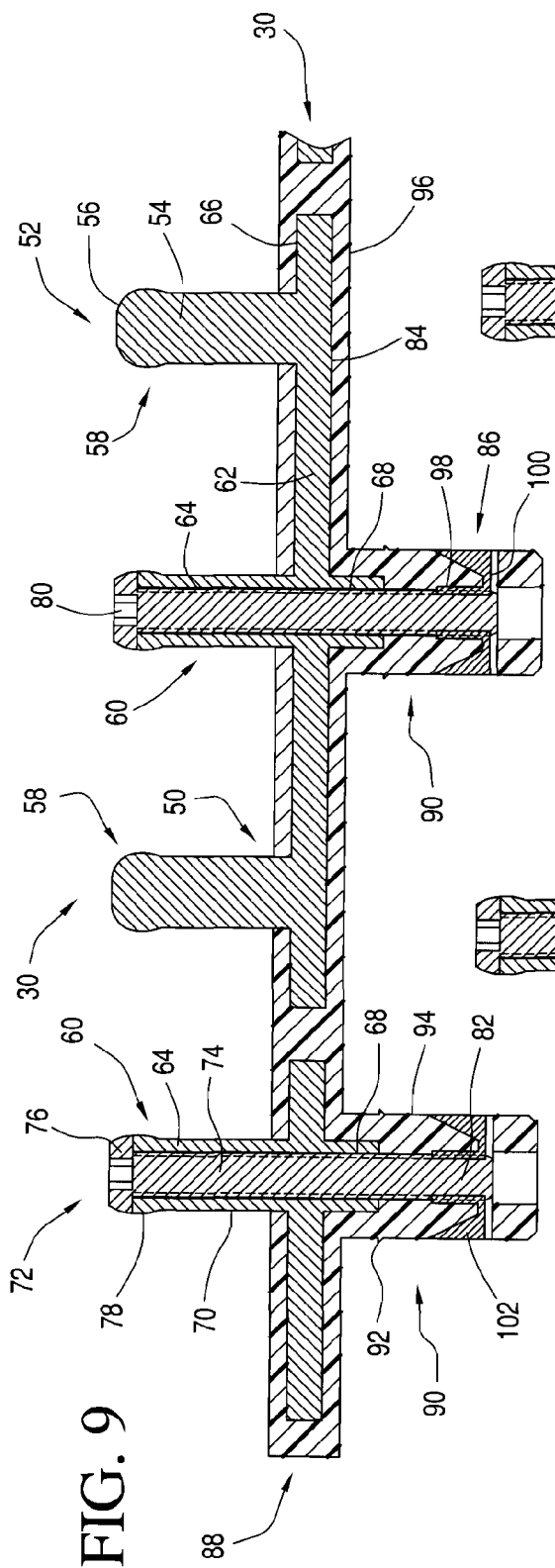
FIG. 9 is a cross-sectional view of a first preferred embodiment of a center retainer in accordance with the present invention, and taken along line 9-9 of FIG. 7.

Referring again to FIG. 7, and as may also be seen in more detail in FIG. 9, in a first preferred embodiment of the present invention, each center retainer 30 is an elongated bar 50 and including a plurality of spaced, upwardly projecting center retainer pins, generally at 52. Each such center retainer pin 52 includes a pin shank 54 and an enlarged pin retainer head 56. In the first embodiment of the center retainer, generally at 30, as depicted in FIG. 9, the center retainer pins, generally at 52 are constituted by simple retainer pins 58 and by compound retainer pins 60. While all of the retainer pins cooperate with the locking strips 26, as will be discussed in detail shortly, the compound retainer pins 60 also act to secure the center retainers 30 to the screen stringer rails 32.

Figure 11:
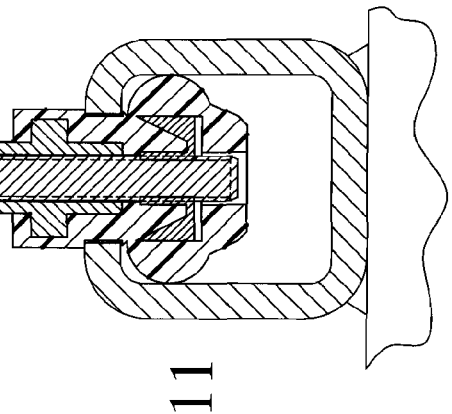
FIG. 11 is a view similar to FIG. 10 and showing the plug portion of the center retainer in its expanded, stringer rail engaging position.
Figure 10:
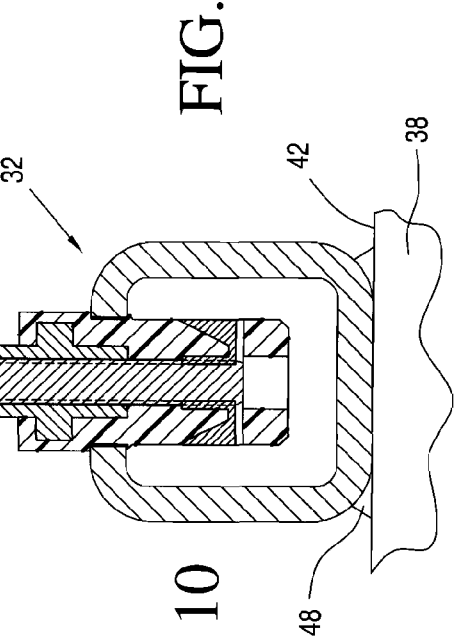
FIG. 10 is an enlarged, cross-sectional view of a portion of the center retainer of FIG. 8, taken along line 10-10 of FIG. 8 and showing the lower plug portion of the center retainer received in one of the holes in an upper surface of a screen stringer rail.

As may be seen most clearly in FIG. 9, in its first preferred embodiment, the center retainer 30 includes a central, generally rectangular retainer spine 62 of metal or another suitable material. Such a central retainer spine 62 can be made of stainless steel or a similar corrosive-resistant metal or alloy or another generally rigid material and has a generally rectangular cross-structural shape, as seen in FIGS. 9-11. The central retainer spine is cast or alternatively may be formed with a plurality of the simple retainer pins 58 formed integrally therewith. Alternating with the upwardly projecting simple retainer pins 58, are upwardly projecting retainer pin sleeves 64. These retainer pin sleeves 64, as seen in FIG. 9, form an exterior surface of the shanks 54 of the compound retainer pins 60 and are of the same length or height and the same diameter or circumference as the shanks 54 of the simple retainer pins 58. The simple retainer pins 58 and the compound retainer pins sleeves 64 all extend upwardly from an upper face 66 of the central retainer spine 62. The central retainer spine 62 also has downwardly extending cylindrical shoulders 68, which shoulders 68 are aligned with the sleeves 64 and cooperate to define a cylindrical aperture 70 in each compound retainer pin 60. A button head bolt 72 is part of each such compound retainer pin 60 and has a bolt shank 74 which is sized to be received in a respective one of the cylindrical apertures 70 in the end of the compound retainer pins 60. A bolt head 76 of each such button head bolt 72 is sized to not pass through the cylindrical apertures 70 and is also sized to be equivalent to the pin retainer heads 56 of each of the simple retainer pins 58. An upper end of each retainer pin sleeve 64 is flared outwardly at 78 so that the head 76 of the button head bolt 74 and the flair 78 will be the same, in size and shape as the head 56 of each of the simple retainer pins 58. Each such bolt head 76 is provided with a drive receptacle 80 that is adapted to receive an Allen wrench or the like. The lower portion 82 of each button head bolt shank 74 is threaded and will engage a threaded expansion nut, generally at 86, as will be discussed in detail shortly.

The generally rigid central retainer spine 62 of the center retainer 38 is, in the preferred embodiment depicted in FIGS. 9-11, encased in a suitable resilient material, which in a preferred embodiment, is a suitable polyurethane cover 88. That molded polyurethane cover 88 conforms, in shape, to the generally rectangular shape of the central retainer spine 62 but does not encase the shanks and heads 54 and 56, respectively of the simple retainer pins 58 and also does not encase the upper pin sleeves 64 which form the shanks of the compound retainer pins 60. This molded polyurethane cover 88 does, as seen in FIGS. 9, 10 and 11, encase the lower shoulders 68 and does encase the expansion nuts 86 to provide a plurality of spaced plugs 90. Each such plug 90 is dimensioned so that it will form an essentially interference fit with the screen stringer rail hole 44 with which it will be aligned. As may be seen in FIG. 7, the plugs 90 are spaced along the bottom of the center retainer 30 with an on-center spacing that aligns with the on-center spacings of the holes 44 in the top face 46 of each screen stringer rail 32. An unexpanded diameter of each such center retainer plug 90 is the same as, or minimally larger than the diameter of each stringer bar hole 44. This will ensure that when the plugs 90 are inserted into the holes 44 of the stringer bars 32, they will not readily fall out or become dislodged during a subsequent securement process, as will be discussed subsequently. As may be seen in FIGS. 9 and 10, each such plug 90 may be molded with an annular rib 92 on its plug sidewall 94 and positioned or spaced at a distance below a lower surface 96 of the resilient ensheathment or cover 88. This spacing distance is selected to be essentially the same as a wall thickness of the tubular screen stringer rail 32, as seen in FIG. 10, and again is provided to initially retain the center retainer 38 on the screen stringer rail 32. The space between the annular rib 92 and the bottom of the polyurethane encasement of the central retainer spine 62 could also have a slightly reduced diameter to form an undercut portion.

As indicated above, each center retainer plug 90 includes a threaded expansion nut 86, as seen in FIGS. 9-11. The threaded extension nut 86 is molded into each center retainer plug 90 during the encasement of the generally rigid central retainer spine 62 in the suitable polyurethane or other resistant material. Each threaded expansion nut 86 has a central internally threaded sleeve 98 which is axially aligned with the shoulder 68 that extends below the lower surface 84 of the retainer bar spine 62, and with the pin sleeve 64. The threaded expansion nut 86 also includes a radially extending flange wall 100 and several circumferentially spaced barbs 102. The barbs 102 are cut into the flange wall 100 and are bent upwardly before the expansion nut 86 is embedded in the resilient material during the formation of each plug 90. These barbs 102 act as rotation preventing devices so that when the threaded lower shank 82 of each button head bolt 72 is inserted into the internally threaded sleeve 98 of its associated expansion nut 86 and is rotated, the expansion nut 86 will not itself rotate and will thus move axially along the shank 82 of the respective button head bolt 72.

Comparing FIGS. 10 and 11, it can be seen that the movement of each threaded expansion nut 86 axially upwardly in its associated resilient plug 90 will extend the sidewalls of each such plug 90 radially outwardly. This expansion effectively enlarges or increases the overall diameter of the associated plug 90 and insures that the plugs 90 will be effectively retained in the holes 44 in the screen stringer rails 32. As may be seen in FIG. 11, the shoulder 68 on the lower surface of the generally rigid retainer bar spine 62 acts to limit the upward travel of the threaded expansion nut 86. This will prevent the possibility of the expansion nut being pulled up the button head bolt shank 74 so far that it passes through, or engages the sides of the holes 44 in the stringer rails 38.

Figure 13:
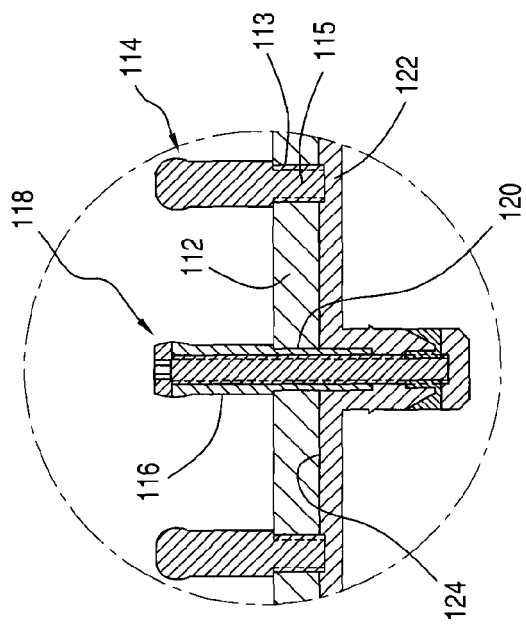
FIG. 13 is an enlarged view of the encircled portion of FIG. 12.
Figure 14:
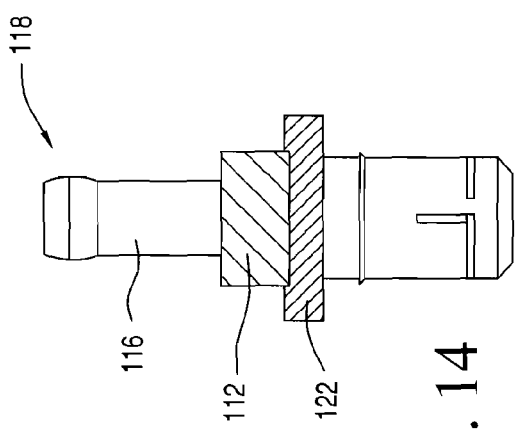
FIG. 14 is an end view, partly in cross-section of the center retainer bar of FIG. 12.
Figure 12:
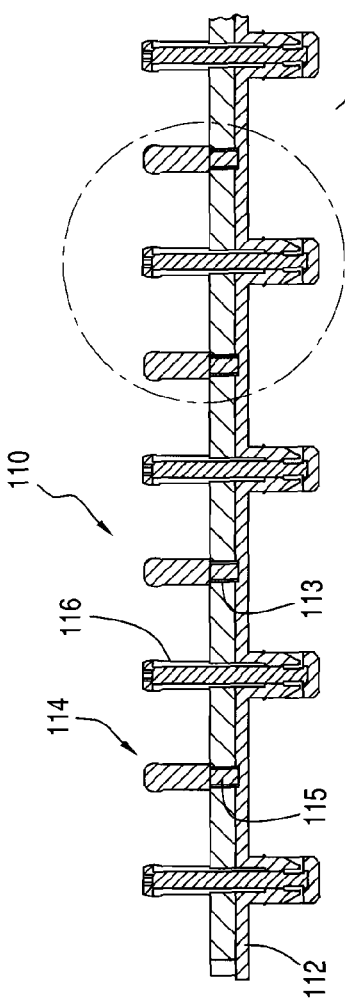
FIG. 12 is a view similar to FIG. 9 and showing a second preferred embodiment of a portion of a center retainer bar in accordance with the present invention.

Turning now to FIG. 12 there may be seen, generally at 110, a second preferred embodiment of a center retainer in accordance with the present invention. This second center retainer 110 is essentially the same in overall shape and operation as the first center retainer 30 described above. The primary difference is that in the second preferred embodiment, the retainer spine 112 is made of a generally rigid material such as nylon which is typically easier to cast or fabricate than is the central spine 62 of the first embodiment of the center retainer 30, if that spine 62 is metal. In this second embodiment 110, the simple retainer pins 114 are formed as separate, one-piece retainer pins 114 using a suitable material such as an ultra-high molecular weight (UHMW) plastic with a threaded lower shank 115, as seen in FIG. 13. These shanks 115 are threaded into cooperatively threaded bores 113 in the nylon spine 112. In this second embodiment, the pin sleeves 116 of the compound retainer pins 118 can be formed integrally with the nylon or similar spine 112 or could be inserted as separate articles into suitable pin sleeve receiving openings 120. The resilient material, such as polyurethane 122, which is similar to the material which encased the metal spine 62 in the first embodiment 30 of the center retainer is, in this second embodiment 110 typically adhered, or bonded to only a lower face 124 of the nylon or similar material center retainer spine 112 of the second preferred embodiment, as may be seen in FIG. 14.

Figure 16:
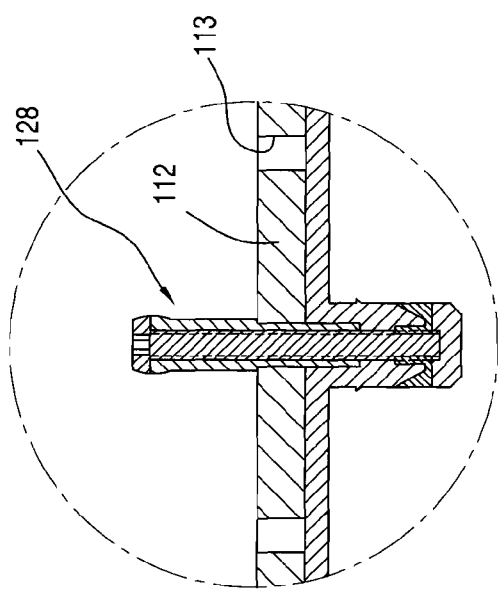
FIG. 16 is an enlarged view of the encircled portion of FIG. 15.
Figure 15:
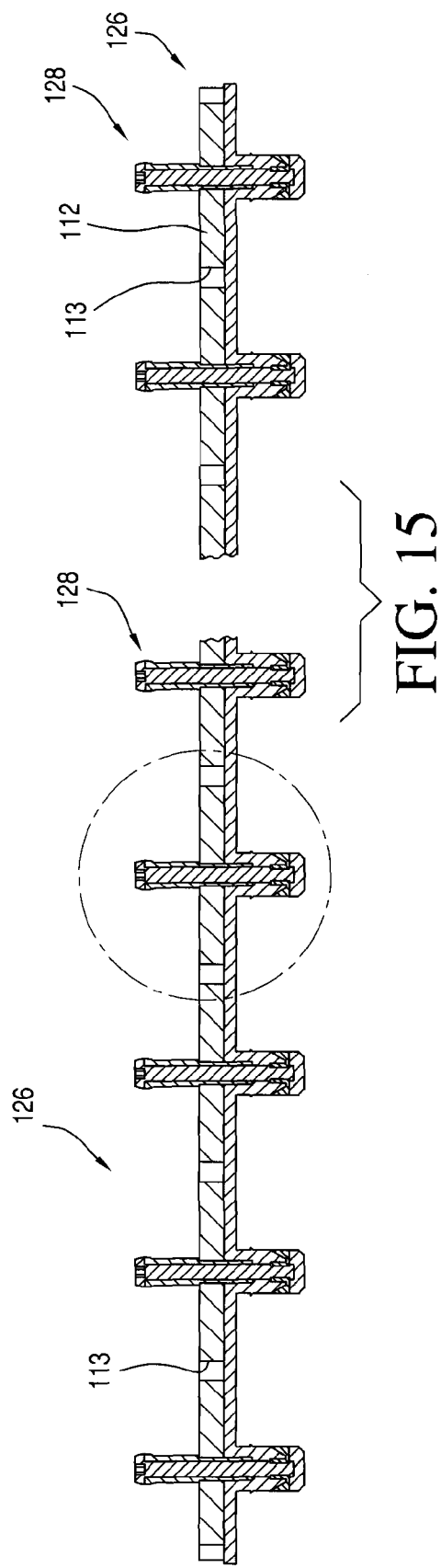
FIG. 15 is a cross-sectional view of a portion of a third preferred embodiment of a center retainer bar in accordance with the present invention.

A third embodiment of a center retainer, in accordance with the present invention, is depicted in FIGS. 15 and 16. In this third embodiment, generally at 126, the difference between it and the second preferred embodiment 110 is that in the third embodiment 126 only the compound retainer pins 128 are provided. The simple retainer pins 114, described in connection with the second preferred embodiment 110 of the central retainer, are not used in this third embodiment. The threaded bores 113 in the central retainer spine 112 may, or may not be present in this third preferred embodiment. This simplified center retainer 126 would reduce assembly time, as will be discussed in detail subsequently. While the overall number of retainer pins will be reduced, with a resultant reduction in the holding strength of the locking strips, again as will be discussed below, the holding strength of the simplified center retainer 126 will still be sufficient for the intended use of this third preferred embodiment of the center retainer bar 126.

A fourth preferred embodiment of a center retainer is shown generally at 130 in FIGS. 17 and 18. In this fourth embodiment, in which elements equivalent to those in the second and third embodiments are given the same reference numeral, the "simple" retainer pins 132 are comprised of a button head bolt with a shortened shank 134 which is threadably secured in the threaded bores 113 of the nylon retainer spine 112. These simple retainer pin shanks 134 are encased in, or fitted into pin sleeves 136 that are essentially the same in structure and function as the pin sleeves 116 discussed in connection with the second preferred embodiment 110 of the center retainer in accordance with the present invention. In overall size and functionality, all four embodiments, 30, 110, 126 and 130 of the central retainer spine, in accordance with the present invention are the same in overall structure and function.

Turning now initially to FIG. 3, there may be seen a snap lock screen panel, generally at 22, in accordance with the present invention. Each screen panel is formed by the attachment of a plurality of parallel, longitudinally extending pieces of profile wire 138 to a number of transverse, longitudinally spaced tie rods 140. As may be seen most clearly in FIG. 19, the longitudinally extending pieces of profile wire, generally at 138 are typically trapezoidal in cross-sectional shape, with spaces between their upper, wider faces 142 defining open slots 144 through which liquidus material, and solidus material below a specific size, can pass. Since the profile screen wires 138 are typically trapezoidal, their wide faces 142 define the upper surface of each screen panel. The spaces or open slots 144 between adjacent ones of the screen wires 138 increase in the downward direction, as seen in FIG. 13. This acts to prevent plugging or blockage of the screen panels 22 during usage.

Figure 19:
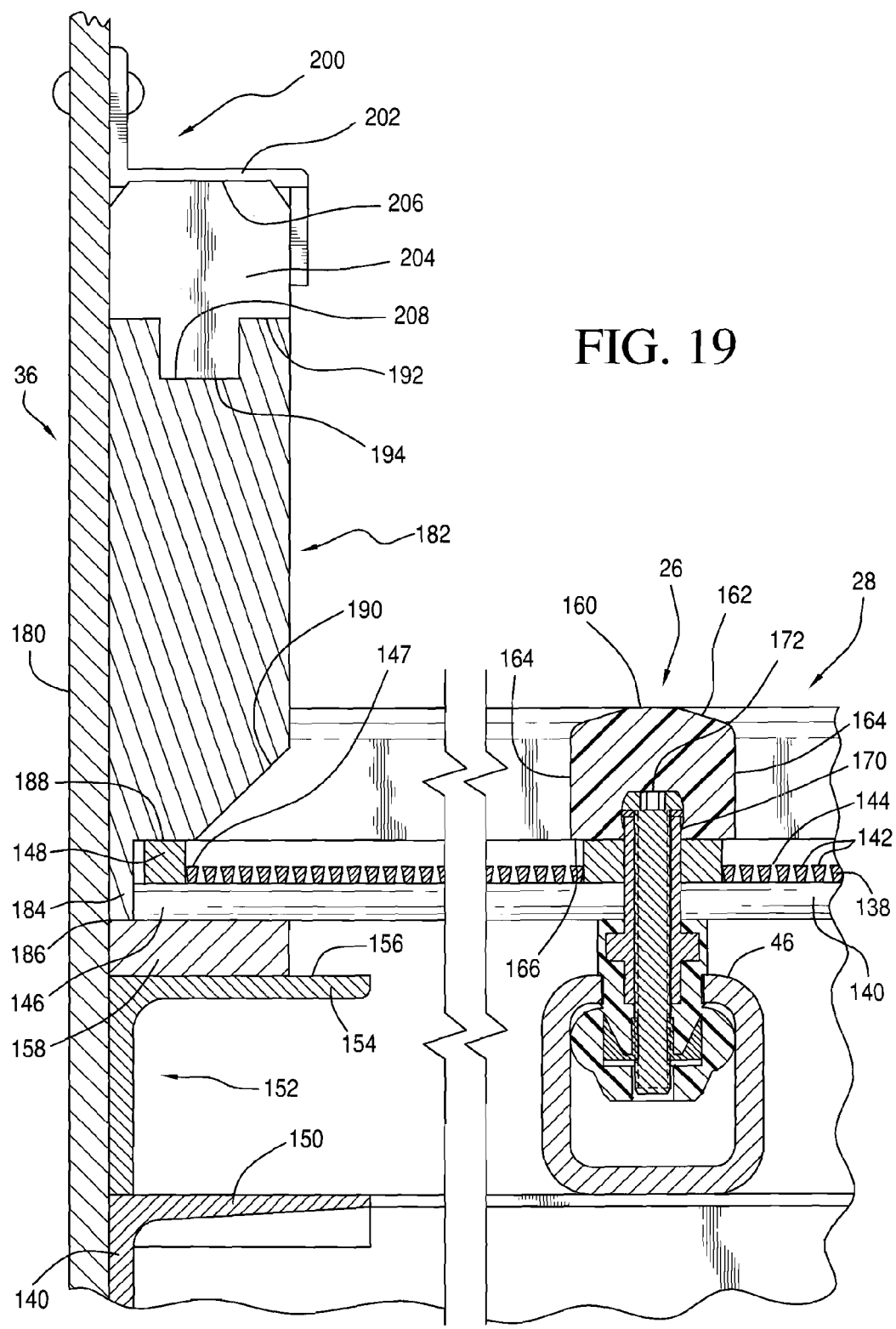
FIG. 19 is an end view, partly in section, of a sideboard and a screen unit in accordance with the present invention in a first preferred embodiment.

The transversely extending, longitudinally spaced tie rods 140 are typically round in cross-section. This may be seen in FIG. 3. Each such tie rod 140 has tie rod ends 146 that extend laterally to both sides of the outboard-most ones 147 of the profile screen wires 138, which define, in cooperation with the tie rods, each of the screen panels. As may be seen most clearly in FIG. 3, and as is also shown in FIGS. 6 and 19, for example, each screen panel 22 includes a pair of screen panel locking bars 148. These screen panel locking bars 148 are secured to the tie rod ends 146 laterally outside of the outboard-most screen profile wires 147. Each such screen panel locking bar 148 is preferably square in cross-section and has a height which is substantially greater than the height of the adjacent profiles screen wires 138, as may be seen most clearly in FIG. 19. These screen panel locking bars 148 define a locking profile and cooperate with the center retainers 30 and with the locking strips 36 and with portions of the sidewalls 36, as will be discussed shortly, to insure that each screen panel 22 will be held securely in place between adjacent ones of the screen stringer rails 32.

As is shown, probably most clearly in FIG. 6, the spacing of the retainer pins 52 on each center retainer 30 is selected so that the shanks 54 of the center retainer pins will interdigitate with the ends 146 of the tie rods of each screen panel. It is to be noted that these tie rod ends 146 are supported on the upper face of the center retainer 30 and, as seen in FIG. 6 extend laterally so that they are generally aligned with a longitudinal center line of each center retainer 30. This is because each center retainer 30 will support the tie rod ends 146 of two adjacent screen panels 22 when the several rows of screen panels 22 are positioned on the bed of a vibrating separatory machine 34, as is illustrated on FIGS. 1 and 2. The support of the tie rod ends of the laterally outermost screen panels 22, at the sidewalls 36 of the vibrating separatory machine 34 will be discussed in detail below.

Referring to FIG. 19, and taken in conjunction with FIGS. 1 and 2, the side walls 36 of the vibrating separatory machine 34 are secured to the side panel channel iron frame members 40 by any suitable expedient which is not particularly relevant to the present invention. An upper web 150 of each channel iron 40 provides a support for a screen stringer angle iron 152. Each said angle iron has a horizontal flange 154 whose upper surface 156 is situated at the same height as the upper surface 46 of each screen stringer rail 32. This flange upper surface 156 may be overlaid with a resilient spacer 158 whose thickness is the same as a thickness of each center retainer 30 between the upper surface 46 of the screen stringer unit 32 and the bottom of the transverse tie rods 140. The outboard ends 146 of the laterally outermost screen panels 22 are supported by the resilient supports 158 when the screen panels are assembled on the bed of the vibrating separatory machine 34, all as seen in FIG. 19.

Once the various screen panels 22 have been placed atop the screen stringer rails 32 and the side wall screen stringer angle irons 152, they must be secured in place with sufficient force that they will not become dislodged during operation of the vibrating separatory machine 34. At the same time, this securement must be relatively easily released so that screens 22 can be substituted for urethane panels 24, so that wire screens or urethane panels having different separating size capabilities can be substituted or so that worn wire screens or urethane panels can be replaced. This secure attachment of the snap lock wire panels 22 and of the urethane panels 24, if used, can be accomplished by using appropriately configured locking strips, cross dams and side boards, as will now be discussed.

An array of locking strips 26 and cross dams 28 are shown in FIG. 1. Each locking strip 26 is, as may be seen in FIG. 19, generally square in cross-section and is provided with an upper face 160 with beveled edges 162, spaced side surfaces 164 and a generally planar bottom 166. That planar bottom 166 is interrupted by a plurality of longitudinally spaced, axially aligned undercut bores 170. Each such undercut bore 170 terminates, in the interior of its respective locking strip, 26 is an enlarged receptacle 172. Each such receptacle 172 is sized to retentively engage the enlarged head 56 of one of the retainer pins 52 with which it will be aligned. The locking strips 26 are made of a suitable resilient, yet durable material that has good abrasion resistance and that will securely engage the pin heads 56 while still being able to release the pin heads 56 when the screen panels 22 or the urethane panels 26 are to be removed. The bottom face 166 of each locking strip 26 is positionable, by proper selection of a depth of the pin receiving bores 170, and the heights of the screen panel locking bar 148, so that the screen panels 22 will be held securely in place between the upper surfaces of the respective center retainers 30 and the lower surfaces 166 of the locking strips. A suitable polyurethane material can be used to form the locking strips. Other resilient, durable materials are usable for the locking strips 26 in accordance with the present invention.

Each sidewall, generally at 36 includes a fixed side panel 180 and a removable side board, generally at 182. Each such side board may be structured, as seen in FIG. 19 with a lower, reduced thickness finger 184 that has a finger tip 186 which is supported on the upper surface of the resilient spacer 158 which, in turn, overlies the screen stringer angle iron 152 and specifically the upper flange 154 thereof. A horizontal shoulder 188 extends from the side board finger 184 to a beveled lower side face 190 of the sideboard 182. An upper surface 192 of the sideboard 182 is formed with a groove 194.

To assemble the snap lock wire panels 22 on the bed of the vibrating separating machine 34, the several screen wire panels 22 are properly aligned and placed with their tie rod ends 146 resting on either the center retainers 30 or, in the case of the outermost screens 22, with their outboard tie rod ends 146 positioned atop the spacer 158. At this point, the sideboards 182 are installed with their fingers 186 engaging the spacer 158 and with their shoulders 188 seating on the upper faces of the screen panel locking bars 148 which are located on the outer sides of the outermost ones of the snap lock screen wire panels 22. Each of the side panels 180 of the machine side walls 36 is provided with spaced wedge plates 200, as seen in FIG. 1. Each such wedge plate 200 is provided with an incline wedge surface 202. A cooperating shaped wedge block 204, with an upper inclined wedge face 206 and with a lower, tongued wedge face 208, in insertable between each wedge plate 200 and the upper surface 192 of each side board 182. A wedging force exerted by the wedge block 204 on the wedge plate 200 will hold the outboard edge of the outermost screen panel 22 securely in place.

Figure 20:
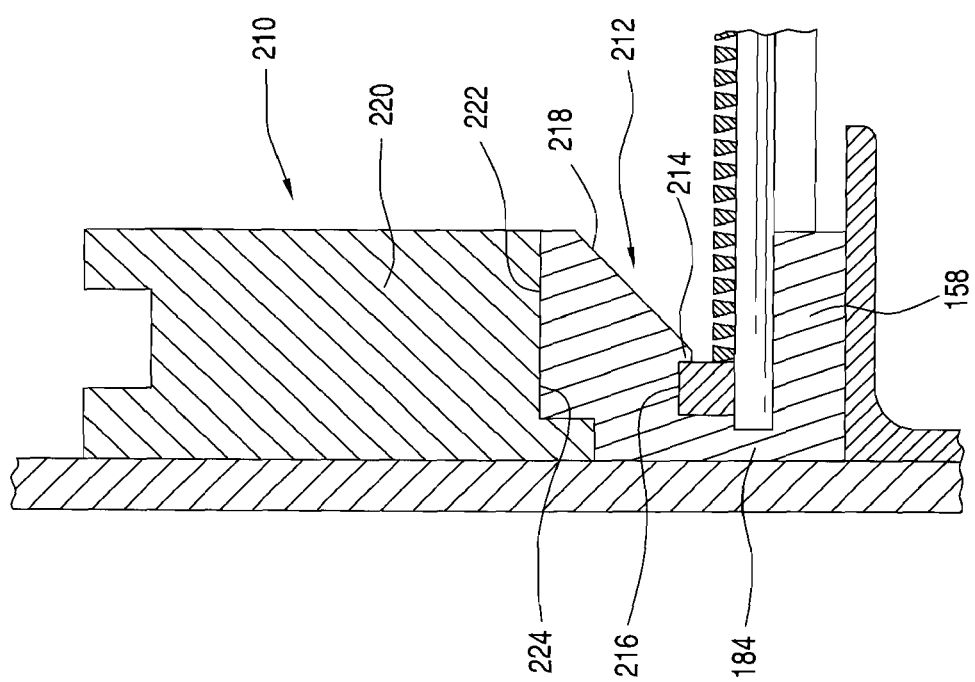
FIG. 20 is a view similar to FIG. 13 and showing a second preferred embodiment of a sideboard and screen unit in accordance with the present invention.

A second embodiment of a side wall arrangement in accordance with the present invention is depicted generally at 210 in FIG. 20. In this second embodiment, the resilient spacer 158, the sideboard finger 184, the sideboard shoulder and the sideboard beveled inner side face are all incorporated into a single resilient profile strip 212. In addition, the resilient profile strip 212 includes a lip 214 at the juncture of the shoulder 216 and beveled inner side face 218. In this second embodiment, the sideboard 220 has a generally planar lower surface 222 which is engagable with an upper face 224 of the profile strip 212. It will be understood that the overall height of the profile strip 212 and the sideboard 220 of the second embodiment of the side wall 210 will be the same as the combined height of the resilient spacer 158 and the more complex sideboard 182 of the first preferred embodiment of the sidewall shown most clearly in FIG. 13. The use of the wedge blocks 204 and the wedge plates 200 is the same for both embodiments.

In the second embodiment of the sidewall assembly shown in FIG. 20, the profile strip 212 is placed on the outboard edge of the outermost screen wire panel 22 before that screen wire panel is installed. Once the profile strip 212 has been so placed, the screen wire panel 22 can be installed and the sideboard 220 can be wedged in place. This positive securement will retain the outboard ends of the outer screen panels firmly in place.

After the various screen wire panels 22 have been positioned on the screen stringer rails 32 and on the screen stringer angle irons 152, the locking strips 26 are installed. As discussed previously, these locking strips 26 overlie the center retainer 32 and are held in place by the cooperative engagement of the enlarged heads 56 of the simple retainer pins 58 and of the compound retainer pins 60 in the cooperatively shaped receptacles 172 that are formed in each locking strip 26. As discussed previously, the sizes and dimensions of the pin shanks, the pin heads, the diameter of the locking strip base and undercut receptacles, the thickness of the screen panel locking bars, which define, with their upper surface, a locking profile, and the sizes of the screen panel tie rods are all selected and dimensioned so that the placement of each locking strip 26 atop the cooperating set of retainer pins 52 will insure that the screen wire panel 22 or panels engaged by that locking strip 26 or strips 26 will be positively and securely held in place. In the stage of assembly depicted in FIG. 2, one screen wire panel 22 is shown at the left of the figure and is held in place both by the left sideboard and the first locking strip 26. The second screen wire panel 26 from the left is being supported, at its two longitudinal edges by the two spaced center retainers. The next bay in the vibrating separatory machine has not yet had a screen panel placed atop the associated center retainers. The right-most screen panel is shown supported at its right longitudinal edge by the flange 156 prior to insertion of a resilient spacer 158. The right side wall and sideboard are not depicted.

In FIG. 1, the portion of the vibrating separating machine shown in FIG. 2 is again shown, together with further screen wire panels 22 and/or urethane panels 24 to be installed and with further locking strips 26 and cross dams 28. As each empty bay shown in FIGS. 1 and 2 is filled with its one of the screen panels that are shown suspended in FIG. 1, the several locking strips will be snapped into place.

Figure 5:
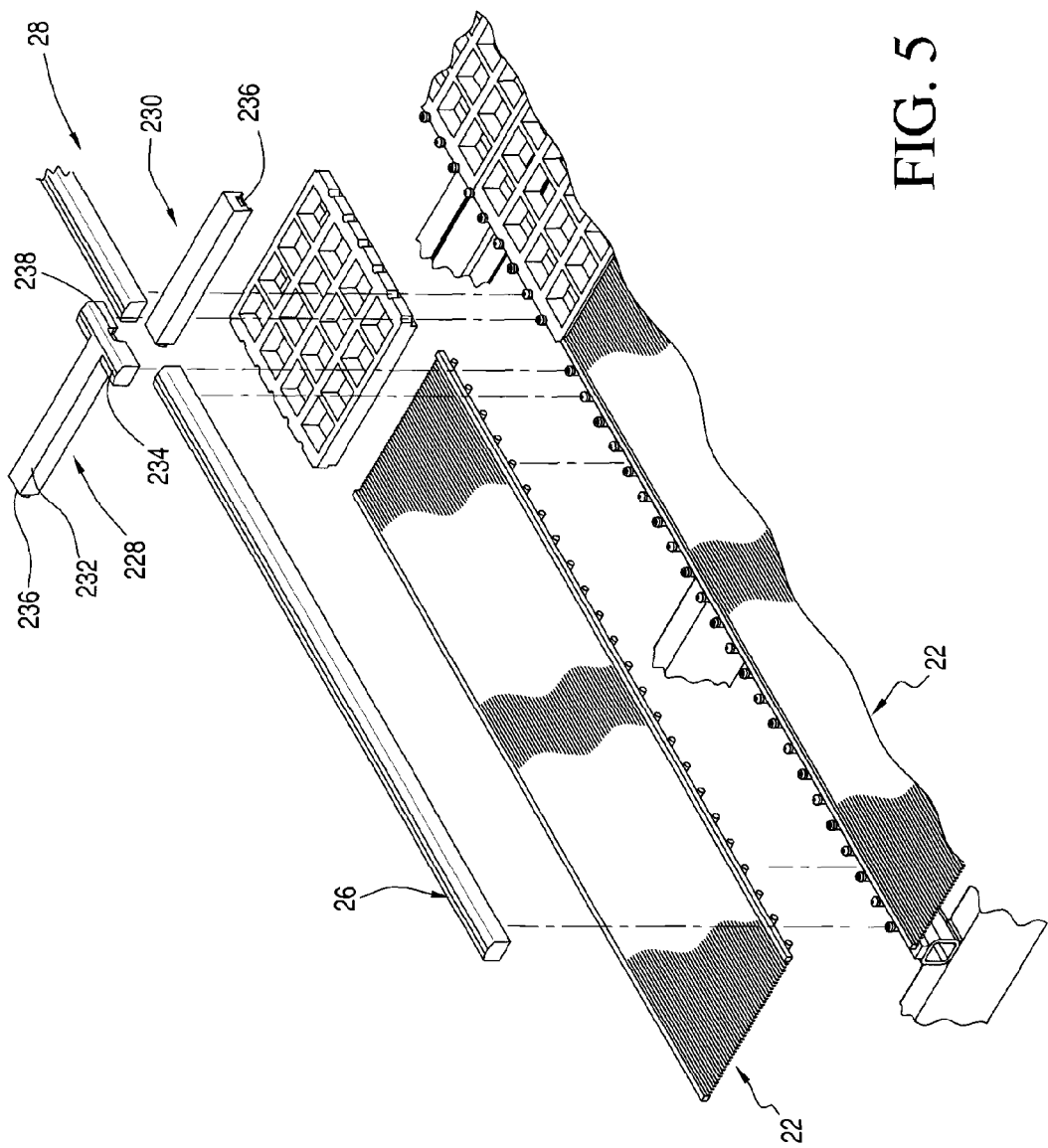
FIG. 5 is an exploded perspective view of several of the snap lock screen panels and several of the urethane panels positionable on the vibrating separatory machine and showing the cooperation of the locking strips, the center retainer and cross dams to secure the screen panels and urethane panels in place.

An enlarged view of a portion of FIG. 1 is presented in FIG. 5. In this view, the suspended snap lock screen wire panel 22 that is situated above the empty bay between two of the center retainers, as seen in FIG. 1, is about to be lowered into place and secured by a locking strip 26. As may be seen in some detail in FIG. 5, the cross dams, generally at 28, are provided as either headed or plain cross dams 228 and 230. Each headed cross dam 228 includes a dam shank 232 and a dam head 234. Each dam head 23 is essentially a mini-locking strip and includes several of the same undercut bores 170 and undercut receptacles 172 as do the locking strips 26. Each such dam head 234 is also provided with a cross-sectional shape that is the same as the cross-section shape of each full length locking strip 26. The dam heads are thus receivable on the retainer pins 52 of the several center retainers 30.

As may be seen in FIG. 1, the dam shanks 232 extend transversely across the bed of the vibrating separatory machine 34 and act, as their name implies, as a dam or as an impediment to flow of the slurry to be separated by the machine 34. Each dam shank 232 has one free end 236, in the case of a headed cross dam 228 or two free ends 236, in the case of a plain dam 230. These free ends 236 are sized and structured to engage a suitably cooperatively shaped socket 238, either in the dam head 234 or in a sideboard 182 or 210 or between two such abutting sideboards. A dam end receiving socket 238 in the end of one of the sideboards 210 is shown in FIG. 2. The cross dam shanks 232 also act to overlie junctions between longitudinally sequential snap lock screen panels 22 or between a screen panel 22 and a urethane panel 24.

A representative urethane panel 24, that is usable in the present invention, is shown in FIG. 4. Each urethane panel 24 is typically a square panel, typically of a size of 12"×12". Each urethane panel 24 has a generally waffle-shaped body defined by longitudinal ribs 240 and transverse ribs 242. These ribs form a gridwork that defines separating compartments 244 having bottoms which may have various perforation patterns, which are not specifically shown in FIG. 4, or which may be completely open. The separating compartments 244 may have various sizes. The urethane panel 24 depicted in FIG. 4 has a 4 by 4 array of compartments 244, each of which is relatively large. The panel 24 could, for example have a 200 by 200 array with each compartment 244 being quite small. Opposed longitudinal side walls 246 and 248 of each urethane panel 24 are undercut, as seen in FIG. 4 to provide panel wall lips or flanges 250. These panel wall lips or flanges 250 form a locking profile for the urethane panels 24. They are scalloped or are provided with spaced semi-cylindrical panel wall recesses 252. As may be seen most clearly in FIG. 5, these semi-cylindrical panel wall recesses 252 are sized and spaced so that each will engage a retainer pin shank 54 and will be supported by one side of a center retainer strip. Two laterally abutting panels 24, as may be seen in FIG. 1, can be held in place by a single locking strip 26. The thickness of each snap lock urethane panel wall lip or flange 250 is the same as the combined height of a snap lock screen wire panel tie rod 132 and locking bar 142. Thus, the projection of the retainer pin shanks 54 and the retainer pin heads 56 above a plane of the urethane panels 24 is the same as is that projection with respect to the snap lock screen panels 22. The result is that each locking strip 26 is equally effective in holding in place several screen panels 22, several urethane panels 24 or a combination of both types of panels by engaging each such panel's locking profile.

Assembly of the vibrating separatory machine 34, using a plurality of the snap lock screen wire panels 22 or of the snap lock urethane panels 24, has been discussed in detail above. Disassembly of the device is accomplished equally as easily. If the screen panels 22, or the urethane panels 24 have worn out, if it is desired to utilize panels with different sized profile openings, or if the screen wire panels and/or urethane panels are to be rearranged, it is simply necessary to pry off the locking strips 26. This is easily accomplished by insertion of the relatively thin blade or tool between the top of one of the screen panel locking bar 148 or between the top of one of the urethane panel wall lips or flanges 250 and the planar bottom 166 of one of the locking strips 26. The exertion of an upwardly directed prying force will unseat the retainer pin heads 56 out of their locking strip receptacles 172. Once this has been accomplished, the locking strips 26 can be easily pulled up and off the retainer pins 52 of the center retainers 30. The wedge blocks 204 can be driven, by suitable hammer blows, out of engagement with their respective cooperating wedge plates 200. Once that has been done, the sideboards 182 or 210 can be removed. This completely frees the snap lock screen wire panels 22 or the urethane panels 24 from any restraints so that they can be picked up and out of the bed of the vibrating separatory machine 34.

The snap lock separatory panels and retainer system, in accordance with the present invention, overcome the limitations of the various prior art system. The panels and retainer system are adaptable for use with various separating machines, made by different manufacturers and do not require that these machines be modified or re-worked. The center retainer plugs are adapted to be received directly in the holes on the screen stringer rails which are industry standard. No additional plugs, pins, inserts or other ancillary securement devices are required. The locking strips install quickly and provide a firm retention of the separatory panels. Once the separatory panels, locking strips and dams have been positioned and installed, the system is keyed or tied together in a manner such that it is very unlikely that a screen wire panel or that a urethane panel can, or will become dislodged. Panel removal, when needed, is quickly and easily accomplished. The snap lock separatory panel and retainer system of the present invention is thus clearly a substantial advance in the art.

While preferred embodiments of a snap lock separatory panel and retainer system, in accordance with the present invention, have been set forth fully and completely hereinabove, it will be apparent to one of skill in the art that various changes in, for example, the overall size of the machinery, the number of screen wire panels or urethane panels to be supported, the particular materials used for the various elements, and the like could be made without departing from the true spirit and scope of the present invention which is accordingly to be limited only by the appended claims.

What is claimed is:

1. A snap lock separatory panel and retainer system comprising:
   a separatory panel having a separatory panel locking profile;
   a center retainer including a plurality of center retainer pins, each such pin including a pin shank and a pin head, said center retainer further including a retainer spine and a resilient retainer encasement;
   means on said center retainer supporting said separating panel with said locking profile adjacent said center retainer pins; and
   a locking strip having a plurality of spaced retainer pin receiving receptacles, said locking strip receptacles being adapted to releasably receive said retainer pins to secure said separatory panel to said center retainer.

2. The snap lock separatory panel and retainer system of claim 1 wherein said center retainer is securable to a screen stringer rail of a vibrating separatory machine.

3. The snap lock separatory panel and retainer system of claim 1 wherein said separatory panel is a separatory screen panel adapted for use with a vibrating separatory machine.

4. The snap lock separatory panel and retainer system of claim 1 wherein at least some of said center retainer pins are formed integral with said retainer spine.

5. The snap lock separatory panel and retainer system of claim 1 wherein at least some of said center retainer pins include pin sleeves joined to said retainer spine.

6. The snap lock separatory panel and retainer system of claim 5 further including a bolt received in each said pin sleeve and having a bolt head forming said center retainer pin head.

7. The snap lock separatory panel and retainer system of claim 1 wherein said locking strip is resilient.

8. The snap lock separatory panel and retainer system of claim 1 wherein each said retainer pin receiving receptacle includes a receptacle bore and an undercut chamber.

9. The snap lock separatory panel and retainer system of claim 8 wherein each said receptacle bore is adapted to receive said pin shank and each said receptacle chamber is adapted to receive said pin head of one of said center retainer pins of said center retainer.

10. The snap lock separatory panel and retainer system of claim 1 wherein said retainer spine is rigid.

11. The snap lock screen panel and retainer system of claim 10 wherein said retainer spine is one of nylon and metal.

12. The snap lock separatory panel and retainer system of claim 10 wherein said retainer spine encasement is polyurethane.

13. The snap lock separatory panel and retainer system of claim 3 wherein each said separatory screen panel includes tie-rods having tie rod ends, said tie rod ends being adapted to interdigitate with said center retainer pins.

14. The snap lock separatory panel and retainer system of claim 1 further including a plurality of cross dams adapted to cooperate with said locking strip and said center retainers.

15. The snap lock separatory panel and retainer system of claim 1 wherein each said separatory panel is a separatory urethane panel adapted for use with a vibrating separating machine.

16. The snap lock separatory panel and retainer system of claim 13 wherein said screen panel includes spaced screen panel locking bars forming said locking profile.

17. The snap lock separatory panel and retainer system of claim 16 wherein each of said locking bars is attached to said tie rod ends.

18. The snap lock separatory panel and retainer system of claim 15 wherein said urethane panel has spaced panel flanges forming said locking profile.

19. The snap lock separatory panel and retainer system of claim 18 wherein said panel flanges include panel wall recesses adapted to interdigitate with said center retainer pins.

20. A snap lock separatory screen wire panel adapted to cooperate with a retainer system in a vibrating separatory machine, said snap lock separatory screen wire panel comprising:
   a plurality of profile separatory screen wires extending parallel to, and spaced apart from each other in a direction of material flow in the vibrating separatory machine, each of said profile separatory screen wires having an upper, generally planar surface of a first size and a lower surface of a second size less than said first size, said plurality of profile separatory screen wires in said separatory screen wires panel including first and second spaced outer ones of said profile separatory screen wires and a plurality of inner ones said profile separatory screen wires bounded by said first and second spaced outer ones of said profile separatory screen wires;

a plurality of spaced, parallel tie rods supporting said profile separatory screen wires and underlying said screen wires, said tie rods being oriented transversely to said plurality of screen wires, said plurality of tie rods each being welded to said lower surfaces of more than one of said plurality of profile separatory screen wires;

a plurality of spaced, parallel tie rod ends of said tie rods, each of said tie rod ends projecting beyond said first and second spaced outer ones of said profile separatory screen wires in a direction transverse to said direction of material flow, and forming first and second tie rod end groups, each of said plurality of tie rod ends having an upper surface; and first and second locking bars each secured to one of said first and second tie rod end groups, each of said locking bars extending parallel to said screen wires and being located adjacent a respective one of said first and second spaced outer ones of said profile separatory screen wires, each said locking bar being generally rectangular in cross-section and forming a locking profile including a lower locking bar face welded to said upper surfaces of said tie rod ends of said respective ones of said first and second tie rod end groups.

21. The snap lock separatory screen wire panel of claim 20 wherein said tie rods are cylindrical in cross section.

22. A snap lock separatory urethane panel adapted to cooperate with a retainer system in a vibrating separatory machine, said snap lock separatory urethane panel comprising:

a generally rectangular panel body including a plurality of longitudinally and laterally extending, intersecting panel ribs, said intersecting panel ribs defining a gridwork containing a plurality of separating compartments;

first and second spaced panel longitudinal side walls;

first and second spaced panel transverse side walls;

an outer longitudinal side wall surface at an outer edge of each said longitudinal side wall, each said outer longitudinal side wall surface being generally vertical in a use position of said snap lock separatory urethane panel;

a plurality of spaced panel wall recesses in each of said outer longitudinal side wall surfaces, said panel wall recesses being spaced apart in a flow direction of a material to be separated by said snap lock separatory urethane panel, each of said panel wall recesses being generally vertically extending in said use position of said snap lock separatory urethane panel and being generally semi-cylindrical; and panel wall flanges on said spaced longitudinal panel side walls and on said spaced transverse panel side walls, said panel wall flanges forming locking profiles.

23. The snap lock separatory urethane panel of claim 22 wherein said separating compartments have open bottoms.

24. The snap lock separatory urethane panel of claim 22 wherein said panel wall flanges have planar upper surfaces.

25. The snap lock separatory urethane panel of claim 22 wherein said panel is rectangular and defines a waffle-shaped body.

* * * * *